United States Patent
Childress

(10) Patent No.: US 8,922,953 B1
(45) Date of Patent: Dec. 30, 2014

(54) DUAL CURRENT-PERPENDICULAR-TO-THE-PLANE (CPP) MAGNETORESISTIVE (MR) SENSOR WITH ANTIPARALLEL-FREE (APF) STRUCTURE AND INTEGRATED REFERENCE LAYERS/SHIELDS

(71) Applicant: HGST Netherlands B.V., Amsterdam (NL)

(72) Inventor: Jeffrey R. Childress, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/331,462

(22) Filed: Jul. 15, 2014

(51) Int. Cl.
*G11B 5/39* (2006.01)

(52) U.S. Cl.
USPC .... 360/319; 360/324; 360/324.12; 360/324.2

(58) Field of Classification Search
USPC ......... 360/319, 324.1, 324.11, 324.12, 324.2, 360/324
See application file for complete search history.

(56) References Cited

U.S. PATENT DOCUMENTS

| | | | |
|---|---|---|---|
| 8,014,108 B2 * | 9/2011 | Shimazawa et al. | 360/319 |
| 8,089,734 B2 * | 1/2012 | Miyauchi et al. | 360/319 |
| 8,402,635 B2 * | 3/2013 | Degawa et al. | 29/603.14 |
| 8,437,106 B2 * | 5/2013 | Yanagisawa et al. | 360/319 |
| 8,462,467 B2 * | 6/2013 | Yanagisawa et al. | 360/319 |
| 8,514,525 B2 | 8/2013 | Childress et al. | |
| 8,749,926 B1 * | 6/2014 | Le et al. | 360/324.12 |
| 2011/0069417 A1 | 3/2011 | Kawamori et al. | |
| 2011/0279923 A1 * | 11/2011 | Miyauchi et al. | 360/75 |
| 2012/0087046 A1 * | 4/2012 | Yanagisawa et al. | 360/294 |
| 2012/0147504 A1 * | 6/2012 | Zhou et al. | 360/324.12 |

* cited by examiner

*Primary Examiner* — Jefferson Evans
(74) *Attorney, Agent, or Firm* — Thomas R. Berthold

(57) ABSTRACT

A dual current-perpendicular-to-the-plane magnetoresistive (CPP-MR) sensor has an antiparallel-free (APF) structure as the free layer and uses the top and bottom shields as reference layers. The free layer is an APF structure that has the two free layers (FL1 and FL2) biased into a "spin-flop" state. In this state, the magnetic bias field from side biasing layers is great enough to stabilize the magnetizations of FL1 and FL2 to have a relative orientation preferably about 90 degrees and symmetrically positioned on either side of the magnetic bias field. The side biasing layers may be formed of soft magnetic material to also function as side shields and the top shield may be ferromagnetically coupled to the side shields, with the magnetization of the top shield being opposite that of the magnetization of the bottom shield.

20 Claims, 7 Drawing Sheets

DUAL CURRENT-PERPENDICULAR-TO-THE-PLANE (CPP) MAGNETORESISTIVE (MR) SENSOR WITH ANTIPARALLEL-FREE (APF) STRUCTURE AND INTEGRATED REFERENCE LAYERS/SHIELDS

BACKGROUND OF THE INVENTION

1. Field of the Invention

The invention relates generally to a current-perpendicular-to-the-plane (CPP) magnetoresistive (MR) sensor that operates with the sense current directed perpendicularly to the planes of the layers making up the sensor stack, and more particularly to a dual CPP-MR sensor.

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. If the sense current is directed perpendicularly through the planes of the layers in the sensor stack, the sensor is referred to as current-perpendicular-to-the-plane (CPP) sensor.

In addition to CPP-GMR read heads, another type of CPP sensor is a magnetic tunnel junction sensor, also called a tunneling MR or TMR sensor, in which the nonmagnetic spacer layer is a very thin nonmagnetic tunnel barrier layer. In a CPP-TMR sensor the tunneling current perpendicularly through the layers depends on the relative orientation of the magnetizations in the two ferromagnetic layers. In a CPP-GMR read head the nonmagnetic spacer layer is formed of an electrically conductive material, typically a metal such as Cu or Ag. In a CPP-TMR read head the nonmagnetic spacer layer is formed of an electrically insulating material, such as $TiO_2$, MgO or $Al_2O_3$.

The CPP-MR sensors described above are "single" CPP sensors because they have a single spacer layer and a single reference layer. A "dual" CPP-MR sensor has a second spacer layer and a second reference layer located on the other side of the free layer, i.e., the side opposite the first spacer layer and first reference layer. Dual CPP-MR sensors are well-known in the art and have been proposed to provide an increased magnetoresistance ($\Delta R/R$) over single CPP-MR sensors. Single CPP-MR sensors are known to be susceptible to current-induced noise and instability. The spin-polarized current flows perpendicularly through the ferromagnetic layers and produces a spin transfer torque on the local magnetization. This can produce excitation, instability, and chaotic motion of the magnetization, resulting in substantial magnetic noise if the sense current is above a certain level. It has been demonstrated that dual CPP-GMR sensors may reduce the sensitivity of the free layer to spin-torque-induced instability. (J. R. Childress et al., "Dual current-perpendicular-to-plane giant magnetoresistive sensors for magnetic recording heads with reduced sensitivity to spin-torque-induced noise", *J. Appl. Phys.* Vol. 99, 08S305, 2006).

The sensor stack in a dual CPP-MR read head is located between two shields of magnetically permeable material that shield the read head from recorded data bits that are neighboring the data bit being read. As the data density increases in magnetic recording disk drives, the read head dimensions decrease. In particular, the flux from the neighboring bits in the along-the-track direction needs to be shielded to improve the spatial resolution of the sensor. This requires that the sensor stack be thinner, and also that the shield-to-shield spacing be reduced. However, it becomes difficult to reduce the thickness of the free and reference ferromagnetic layer without a significant reduction in the sensed signal. It is also difficult to reduce the thickness of the antiferromagnetic layer without losing magnetic stability in the reference layer.

A dual CPP-MR sensor wherein the shield layers also function as the reference layers is described in U.S. Pat. No. 8,514,525 B2, which is assigned to the same assignee as this application. The integrated reference layers/shields enables the sensor stack to be thinner, which improves the spatial resolution of the sensor. However, this type of dual CPP-MR sensor requires a ferromagnetic biasing layer behind the sensor in the region recessed from the surface that faces the disk, which increases the complexity of fabricating the sensor.

What is needed is a dual CPP-MR sensor with integrated reference layers/shields that does not require a biasing layer behind the sensor.

SUMMARY OF THE INVENTION

Embodiments of the invention relate to a dual CPP-MR sensor that has an antiparallel-free (APF) structure as the free layer and that uses the top and bottom shields as reference layers. The free layer is not a conventional APF layer that has two free layers (FL1 and FL2) antiparallel coupled with their magnetizations antiparallel, but an APF structure that has FL1 and FL2 biased into a "spin-flop" state. In this state, the magnetic bias field from side biasing layers is great enough to stabilize the magnetizations of FL1 and FL2 to have a relative orientation preferably about 90 degrees and symmetrically positioned on either side of the magnetic bias field. This allows for a sensor with reference layers integrated as the top and bottom shields but without a back biasing layer behind the sensor. The side biasing layers may be formed of soft magnetic material to also function as side shields and the top shield may be ferromagnetically coupled to the side shields, with the magnetization of the top shield being opposite that of the magnetization of the bottom shield. The overall direction of the electron current (opposite to the direction of sense current) is chosen so that the two main sources of spin-torque tend to rotate FL1 and FL2 in opposite directions, thus canceling each other.

For a fuller understanding of the nature and advantages of the present invention, reference should be made to the following detailed description taken together with the accompanying figures.

DETAILED DESCRIPTION OF THE INVENTION

Figure 1:
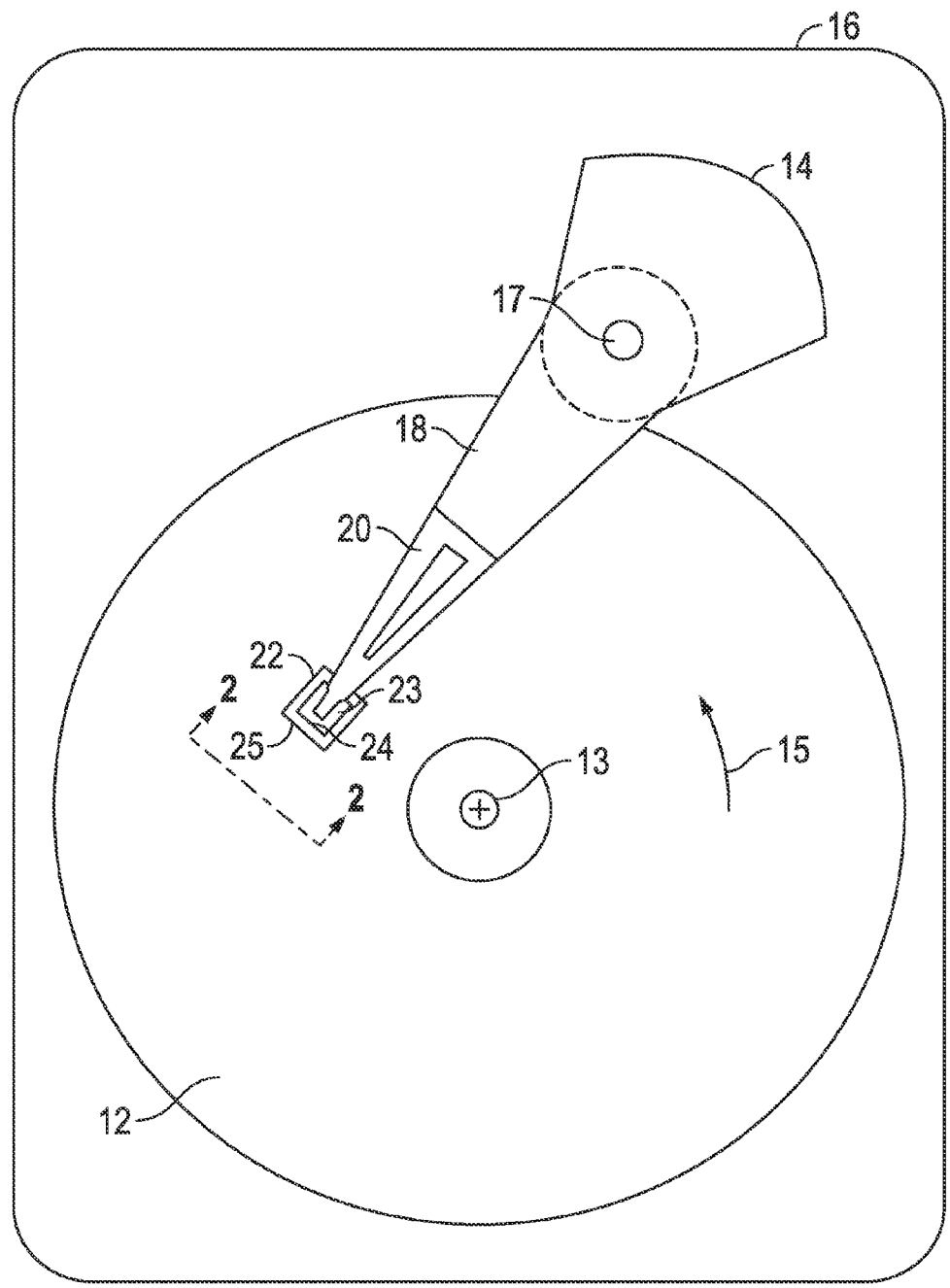
FIG. 1 is a schematic top view of a conventional magnetic recording hard disk drive with the cover removed.

The CPP magnetoresistive (MR) sensor of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
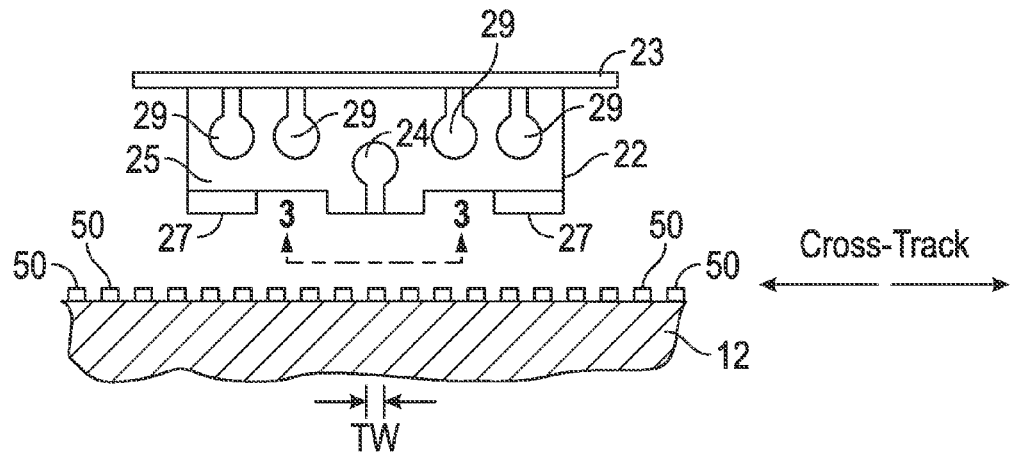
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
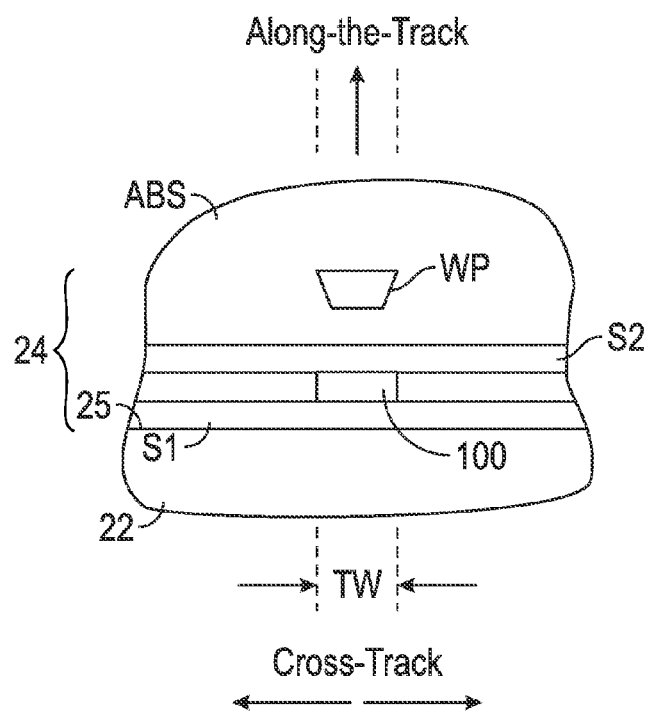
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP-MR sensor or read head 100 is located between two magnetic shields S1 and S2. The shields S1, S2 are formed of magnetically permeable material and may also be electrically conductive so they can function as the electrical leads to the read head 100. The shields function to shield the read head 100 from recorded data bits that are neighboring the data bit being read. Separate electrical leads may also be used, in which case the read head 100 is formed in contact with layers of electrically conducting lead material, such as tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4A:
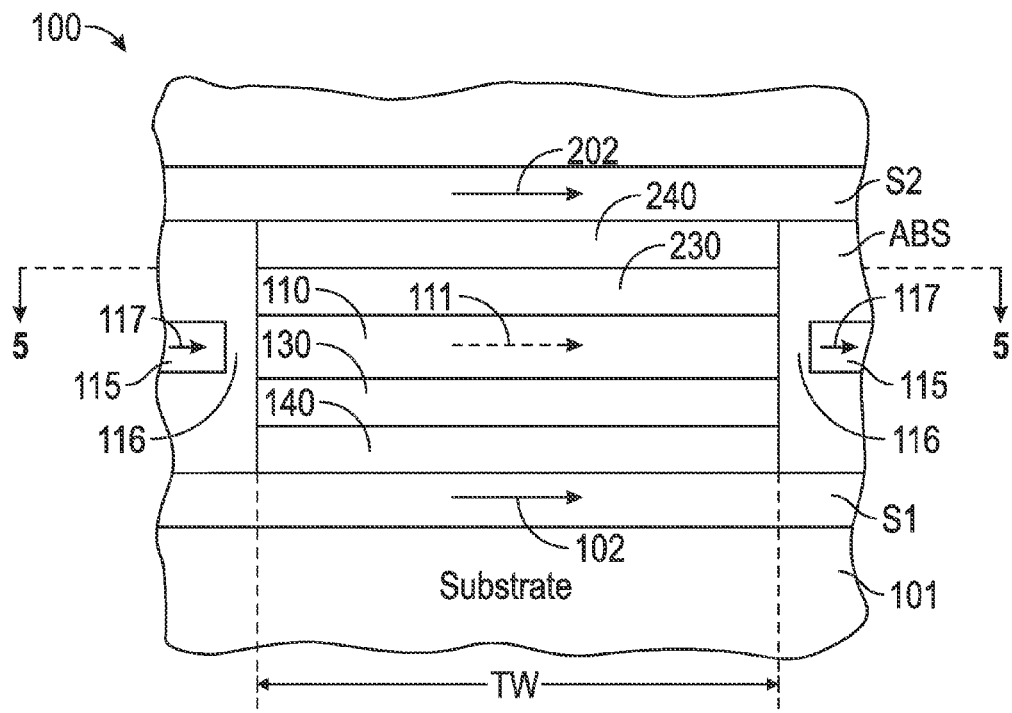
FIG. 4A is an enlarged sectional view showing the layers making up a dual current-perpendicular-to-the-plane magnetoresistive (CPP-MR) sensor wherein shields S1, S2 also function as the reference layers.

FIG. 4A is an enlarged sectional view showing the layers making up a prior art sensor 100 as would be viewed from the disk. Sensor 100 is a prior art dual CPP-MR read head wherein shields S1, S2 also function as the reference layers, and is described in more detail in U.S. Pat. No. 8,514,525 B2, which is assigned to the same assignee as this application. The sensor 100 comprises a stack of layers formed between the two magnetic shield layers S1, S2 that are typically electroplated NiFe alloy films. The shields S1, S2 are formed of electrically conductive material and thus may also function as electrical leads for the sense current, which is directed generally perpendicularly through the layers in the sensor stack.

Figure 5:
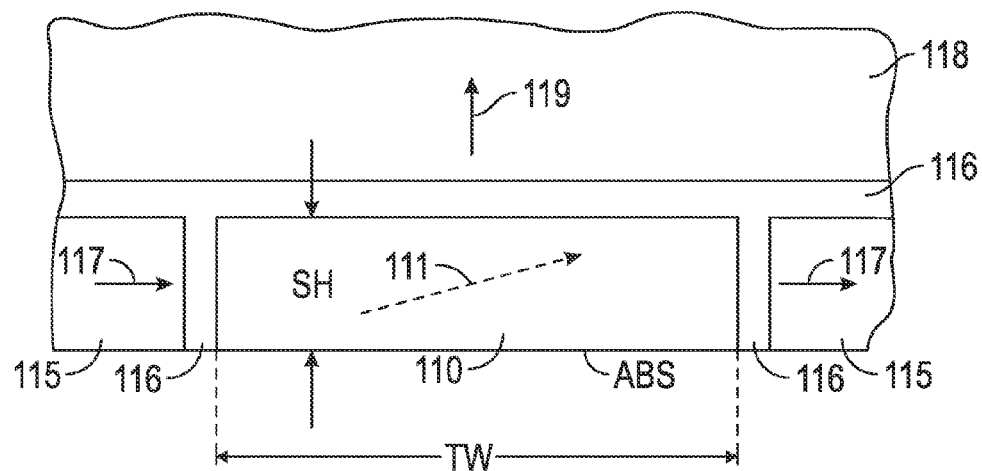
FIG. 5 is a view of section 5-5 of FIG. 4A and is a view of a plane orthogonal to the ABS for illustrating the biasing structure of the sensor.

As shown in FIG. 4A, lower shield S1 that functions as a first reference layer has a fixed magnetization 102 oriented substantially parallel to the ABS, and upper shield S2 that functions as a second reference layer has a fixed magnetization 202, also oriented substantially parallel to the ABS and to the magnetization 102 of lower shield S1. Sensor 100 also includes first nonmagnetic spacer layer 130 and optional first magnetic interface layer 140 between free layer 110 and lower shield S1, and similarly second spacer layer 230 and optional second magnetic interface layer 240 between free layer 110 and upper shield layer S2. Because the quiescent magnetization 111 of free layer 110 is desired to be oriented at an angle relative to magnetizations 102, 202, preferably between 120 and 150 degrees, to optimize the sensor response to magnetic fields from the recorded data bits on the disk, it is necessary to bias the magnetization 111 in the desired direction. A portion of the biasing structure is shown in FIG. 4A by ferromagnetic side biasing layers 115 with magnetizations 117 that are formed outside near the side edges of the free layer 110 and electrically insulated from free layer 110 by insulating regions 116. The side biasing layers 115 may be formed of a hard magnetic material. Alternatively, the biasing layers 115 may be formed of soft magnetically permeable material that also functions as side shields. The complete biasing structure with free layer 110 is shown in FIG. 5, which is a section 5-5 of FIG. 4A and is a view of a plane orthogonal to the ABS. FIG. 5 shows the free layer 110 with track width TW and height in a direction orthogonal to the ABS, referred to as the stripe height (SH). The complete biasing structure includes back biasing layer 118 that is recessed from the ABS and that has a magnetization 119 oriented generally orthogonal to the ABS and to the magnetizations 117 of side biasing layers 115. Thus, in the absence of an external magnetic field, the biasing layers 115 and 119 together bias the magnetization 111 of free layer 110 generally at an angle of about 45 degrees from the ABS and 135 degrees from the magnetization 102 of S1 and 202 of S2 (FIG. 4A).

In the presence of an external magnetic field in the range of interest, i.e., magnetic fields from recorded data on the disk 12, the magnetization direction 111 of free layer 110 will rotate while the magnetization directions 102, 202 of reference layer/shields S1, S2, respectively, will remain fixed and not rotate. Thus when a sense current is applied from top shield S2 perpendicularly through the sensor stack to bottom shield S1, the magnetic fields from the recorded data on the disk will cause rotation of the free-layer magnetization 111 relative to the reference-layer magnetizations 102, 202, which is detectable as a change in electrical resistance.

Figure 4B:
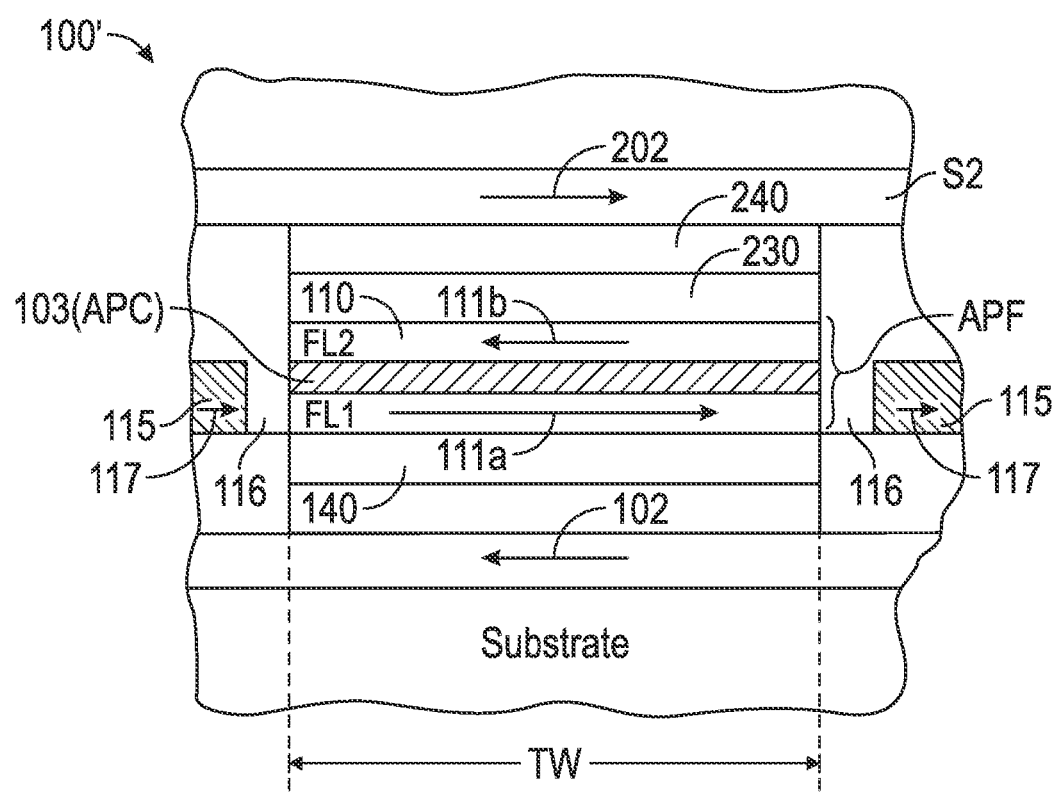
FIG. 4B is an enlarged sectional view showing the layers making up a sensor like the sensor in FIG. 4A but with an antiparallel-free (APF) structure.

The dual CPP-MR sensor depicted in FIG. 4A has magnetizations 102, 202 of S1, S2, respectively, oriented parallel. In this embodiment the free layer 110 is a single free layer. However, the dual CPP-MR sensor may alternatively have an antiparallel-free (APF) layer. FIG. 4B is an enlarged sectional view showing the layers making up a sensor 100', which is like sensor 100 in FIG. 4A except that the free layer 110 is replaced with an APF structure and the magnetizations 102, 202 of S1, S2 are oriented antiparallel to assure that the signals from the top and bottom portions of the sensor are added together. The APF structure comprises a first free ferromagnetic layer FL1, second free ferromagnetic layer FL2, and an antiparallel (AP) coupling (APC) layer 103. APC layer 103, such as a thin (between about 4 Å and 10 Å) Ru film, couples FL1 and FL2 together antiferromagnetically with the result that FL1 and FL2 maintain substantially antiparallel magnetization directions, as shown by arrows 111a, 111b, respectively. The antiferromagnetically-coupled FL1 and FL2 rotate together in the presence of magnetic fields from data recorded in a magnetic recording medium. The net magnetic moment/area of the APF structure (represented by the difference in magnitudes of arrows 111a, 111b) is (M1*t1−M2*t2), where M1 and t1 are the saturation magnetization and thickness, respectively, of FL1, and M2 and t2 are the saturation magnetization and thickness, respectively, of FL2. Thus the thicknesses of FL1 and FL2 are chosen to obtain the desired net free layer magnetic moment for the sensor 100'. The side biasing layers 115 bias both FL1 and FL2 simultaneously.

Embodiments of the invention relate to a dual CPP-MR sensor that uses the shields S1, S2 as reference layers. The free layer is an APF structure that is biased into a "spin-flop" state with sufficient biasing field solely from side biasing layers to place the FL1 and FL2 magnetizations at a (fixed) relative angle of less than 180 degrees, preferably at approximately 90 degrees. This allows for an integrated-shield sensor without any back biasing structure like the prior art biasing layer 118 (FIG. 5).

Figure 6:
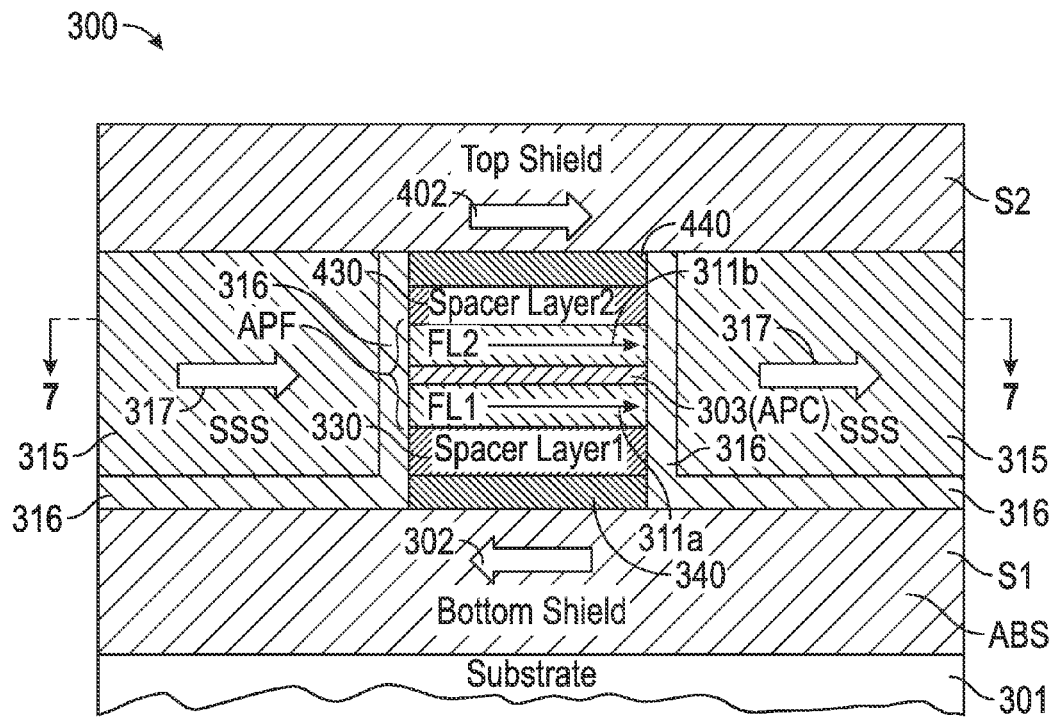
FIG. 6 is an enlarged sectional view showing the layers making up a sensor according to an embodiment of the invention as would be viewed from the disk.
Figure 7:
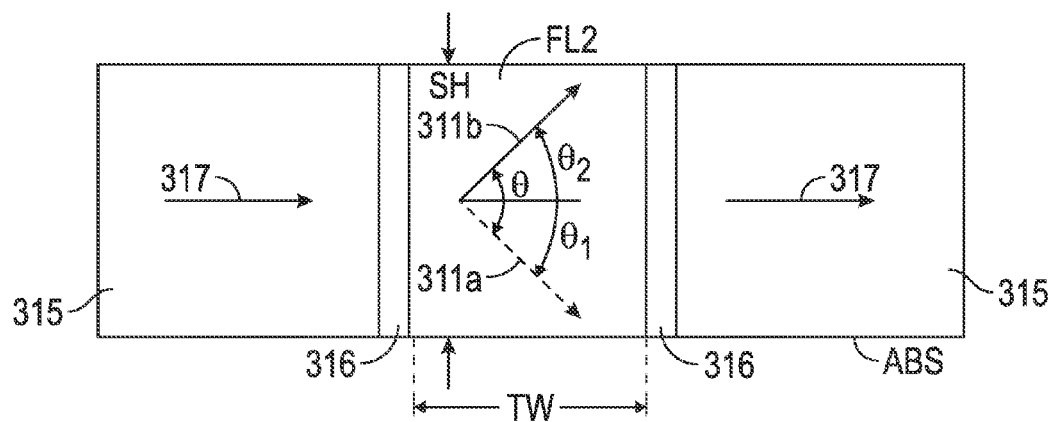
FIG. 7 is a view of section 7-7 of FIG. 6 and is a view of a plane orthogonal to the ABS for illustrating the spin-flop state of the APF structure.

FIG. 6 is an enlarged sectional view showing the layers making up sensor 300 according to an embodiment of the invention as would be viewed from the disk. The sensor 300 is formed on a substrate 301, which may be the trailing surface of an air-bearing slider in a disk drive. The APF structure comprises a first free ferromagnetic layer (FL1), second free ferromagnetic layer (FL2), and an antiparallel coupling (APC) layer 303. APC layer 303, such as a thin (between about 4 Å and 10 Å) Ru film, tends to couple FL1 and FL2 together antiferromagnetically with the result that FL1 and FL2 would maintain substantially antiparallel magnetization directions in the quiescent state. Thus in the absence of any other magnetic fields the magnetizations of FL1 and FL2 would be antiparallel. However, in the embodiment of this invention, soft side shields (SSS) 315 are formed outside of the sensor stack near the side edges of the APF structure. The side shields 315 are electrically insulated from FL1 and FL2 by insulating regions 316, which may be formed of alumina ($Al_2O_3$), for example. The side shields 315 have magnetizations 317 generally parallel to the ABS with a strength that overcomes the antiparallel coupling strength across APC layer 303 such that the magnetizations 311a of FL1 and 311b of FL2 are generally biased in the same general orientation as magnetization 317. This is shown in the top view of FIG. 7, which is a view of section 7-7 of FIG. 6 and depicts magnetizations 311a, 311b of FL1, FL2, respectively, biased in the same general orientation as side shield magnetizations 317 and oriented relative to one another with a non-zero angle θ less than 180 degrees, preferably less than 120 degrees and greater than 60 degrees. In the optimal state θ is about 90 degrees and each magnetization 311a, 311b makes an angle θ1, θ2, respectively, of about 45 degrees with respect to magnetization 317. This state, wherein the magnetic bias field from the side shields 315 is great enough to stabilize the magnetizations 311a, 311b to have a relative orientation less than 180 degrees, symmetrically positioned on either side of the magnetic bias field, is referred to as the "spin-flop" state of the APF structure. The APC layer 303 composition and thickness is chosen to achieve the required angle θ with the available magnetic field from the stabilizing side shields 315. While FL1 and FL2, without the stabilizing field from magnetizations 317 would be antiparallel-coupled and have a net moment near zero, upon stabilization with the field from the side shields 315 the net magnetization of FL1 and FL2 is oriented in the direction generally parallel to magnetization 317 and has a non-zero value which can be adjusted. Similarly the composition of the side shields 315 can be adjusted to adjust the strength of magnetizations 317. Due to the spin-flop state induced in the APF structure, there is no stabilizing magnetic biasing field required in the back of the sensor, i.e., behind FL1 and FL2 in the region recessed from the ABS. Thus the sensor 300 is easier to manufacture and can have improved stability and reliability.

Referring again to FIG. 6, FL1 is separated from S1 by a first nonmagnetic spacer layer 330. Similarly, FL2 is separated from S2 by a second nonmagnetic spacer layer 430. In this embodiment the sensor is a CPP-GMR sensor so the spacer layers 330, 430 are formed of a metallic electrically conductive material like Cu, Au, Ag or their alloys. S2 has a magnetization 402 that is antiparallel to magnetization 302 of S1. Each of S1 and S2 acts as a reference layer with fixed magnetizations 302, 402, respectively. Upon excitation with the magnetic fields from the disk, the compound FL1 plus FL2 bilayer rocks back and forth, keeping the angle θ between FL1 and FL2 approximately constant, resulting in a magnetoresistance (MR) response due to the GMR effects between FL1 and S1, and FL2 and S2. Due to the magnetic orientations chosen, the two contributions add up. In addition, the effect of spin-torque from the sensor electrical current must be considered. Referring again to FIG. 6, the overall direction of the electron current (opposite to the direction of sense current) in the magnetoresistive sensor is chosen to be from S2 to S1. The principal spin-torque excitation comes from the spin-polarized electron current from S2 onto FL2, which will tend to align FL2 with S2, but will be small because the two magnetization directions are nearly parallel. Similarly, there will also be spin-torque generated on FL1 due to the reflected electron current from S1 to FL1, and this torque will tend to align FL1 antiparallel to S1. Thus the two main sources of spin-torque tend to cancel each other, as they tend to rotate FL1 and FL2 in opposite directions. By contrast, the spin-torque between FL1 and FL2 is relatively small because the APC layer 303 also causes effective spin-memory loss between the layers. Consequently an advantage of the present invention is that the net spin-torque effect on the FL1 and FL2 coupled system is expected to be small, and therefore the sensor voltage bias, output voltage, and signal-to-noise ratio are expected to be larger than conventional sensors.

Sensor 300 may also include an optional magnetic interface layer 340 between S1 and spacer layer 330, and an optional magnetic interface layer 440 between spacer layer 430 and S2. The magnetic interface layers 340, 440 may be a CoFe alloy with a thickness between about 2-20 Å. The Fe concentration in atomic percent (at.%) is preferably between about 30-70 at.%, and preferably close to 50 at.%. The CoFe interface layer improves MR through higher interfacial scattering at the interface between the shield and the nonmagnetic spacer layer. This is accomplished in two ways. First, because the nonmagnetic spacer layer (typically Cu, Au, or Ag in a CPP-GMR sensor) would readily alloy with the NiFe in the shields if it were in contact with shield, the interface layers 340, 440 locate the spacer layer 330, 430 material away from the NiFe shield material. Second, CoFe has higher interfacial spin scattering with materials such as Cu than does NiFe. The magnetic interface layers 340, 440 may also be an alloy with high spin-polarization, with a thickness between about 10 Å and 40 Å, such as Heusler alloys of the type $Co_2MnZ$ or $Co_2FeZ$ where Z is one of Ge, Si, Al, or other alloys such as $(CoFe)_{1-x}Y_x$ where Y is one of Ge, Si, Al, Ga which are known to result in an enhanced MR in a CPP spin-valve structure.

Bottom shield layer S1 with integrated reference layer and thus with a magnetization 302 may have similar dimensions to a conventional S1 shield layer. However, embodiments with smaller dimensions and elongated aspect ratios are preferred in order to improve the magnetic characteristics of the sensor. Thus, shield layer S1 may have a thickness in the range of about 40 to 300 nm in the along-the-track direction, which is substantially thinner than the conventional first shield S1 (FIG. 3), which has a typical thickness in the range of about 1-3 μm. Shield layer S1 may also have a cross-track width in the range of about 100 to 750 nm, as compared to the width of a conventional first shield S1 of about 4-10 μm and to the sensor width TW of about 10-50 nm. Shield layer S1 may also have a "height" in the direction orthogonal to the ABS in the range of about 20 to 300 nm, as compared to the height of a conventional first shield S1 of about 2-5 μm and to the sensor SH of about 10-100 nm. Also, the aspect ratio of the cross-track width to the height for S1 is preferably greater than 2, which provides additional stabilization of the magnetization 302 through magnetic shape anisotropy.

Bottom shield layer S1 with integrated reference layer may comprise a plurality of magnetic layers coupled either parallel or antiparallel to each other through the use of thin metallic or APC layers such as Ru, and may have its magnetization 302 fixed by being exchange-coupled to an antiferromagnetic (AF) layer (not shown) between S1 and substrate 301. The AF layer may be located below substantially the entire cross-track width of S1 or only in the end regions. The AF layer is typically a Mn alloy, e.g., PtMn, NiMn, FeMn, IrMn, PdMn, PtPdMn or RhMn.

Top shield S2 with integrated reference layer and thus with a magnetization 402 may have similar dimensions to bottom shield/reference layer S1. S2 may comprise a plurality of magnetic layers coupled either parallel or antiparallel to each other through the use of thin metallic or APC layers such as Ru, and may have its magnetization 402 fixed by being exchange-coupled to an antiferromagnetic (AF) layer (not shown) located on S2.

In the embodiment of FIG. 6, the side shields 315 are connected magnetically to top shield S2 so their magnetizations 317 are parallel to the magnetization 402 of top shield S2. This helps stabilize the magnetizations 317 of side shields 315. The bottom shield/integrated reference layer S1 with magnetization 302 is isolated from side shields 315 by insulating layers 316. The side shields 315 are a soft magnetically permeable material and can be a material identical to S2, or can be a different magnetic material, or a multilayer to achieve specific stabilization properties. "Soft" magnetic materials can be easily magnetized and demagnetized at low magnetic fields. The soft side shields can be formed of an alloy comprising Ni and Fe with permeability (μ) preferably greater than 100. The material of the side shields should also have a low easy-axis coercivity, less than 10 Oe, and a saturation magnetization $M_s$ greater than or equal to 450 emu/cm$^3$ and less than or equal to 900 emu/cm$^3$. Any of the known materials suitable for use in the along-the-track shields S1 and S2 may be used for the side shields. Specific compositions for the bottom shield S1, the top shield S2 and the side shields 315 include NiFe$_x$, where x is between 1 and 25, and (NiFe$_x$)Mo$_y$, or (NiFe$_x$)Cr$_y$, where y is between 1 and 8, where the subscripts are in atomic percent.

The typical materials used for FL1 and FL2 are crystalline CoFe or NiFe alloys, or a multilayer of these materials, such as a CoFe/NiFe bilayer. FL1 and/or FL2 may also be formed of Heusler alloys, i.e., metallic compounds having a Heusler alloy crystal structure of the type $Co_2MnX$ (where X is one or more of Ge, Si, or Al), or $Co_2FeZ$ (where Z is one or more of Ge, Si, Al or Ga) or (CoFe$_x$Cr$_{(1-x)}$)Al (where x is between 0 and 1). FL1 and/or FL2 may also be formed of a non-Heusler alloy of the form $(Co_yFe_{100-y})_{(100-z)}X_z$ (where X is one or more of Ge, Al, Si or Ga, y is between about 45 and 55 atomic percent, and z is between about 20 and 40 atomic percent). The preferred type of CoFeX material is CoFeGe, which is described in U.S. Pat. No. 7,826,182 B2 for use in CPP-MR sensors, including use in APF structures.

In the embodiment of FIG. 6, because the integrated top shield/reference layer S2 is ferromagnetically coupled to side shields 315, the direction of electron current (opposite to the direction of sense current) is from top shield S2 toward bottom shield S1. This assures spin-torque stability as explained above. In an alternative embodiment to the embodiment of FIG. 6, the integrated bottom shield/reference layer S1 may be ferromagnetically coupled to side shields 315, in which case the magnetization 302 of S1 would be parallel to magnetizations 317 of side shields 315. The top shield/integrated reference layer S2 would be isolated from side shields 315 by insulating layers and would have its magnetization 402 oriented antiparallel to magnetization 302 of S1. In this embodiment, the preferred direction of electron current (opposite to the direction of sense current) would be from bottom shield S1 toward top shield S2.

Figure 8A:
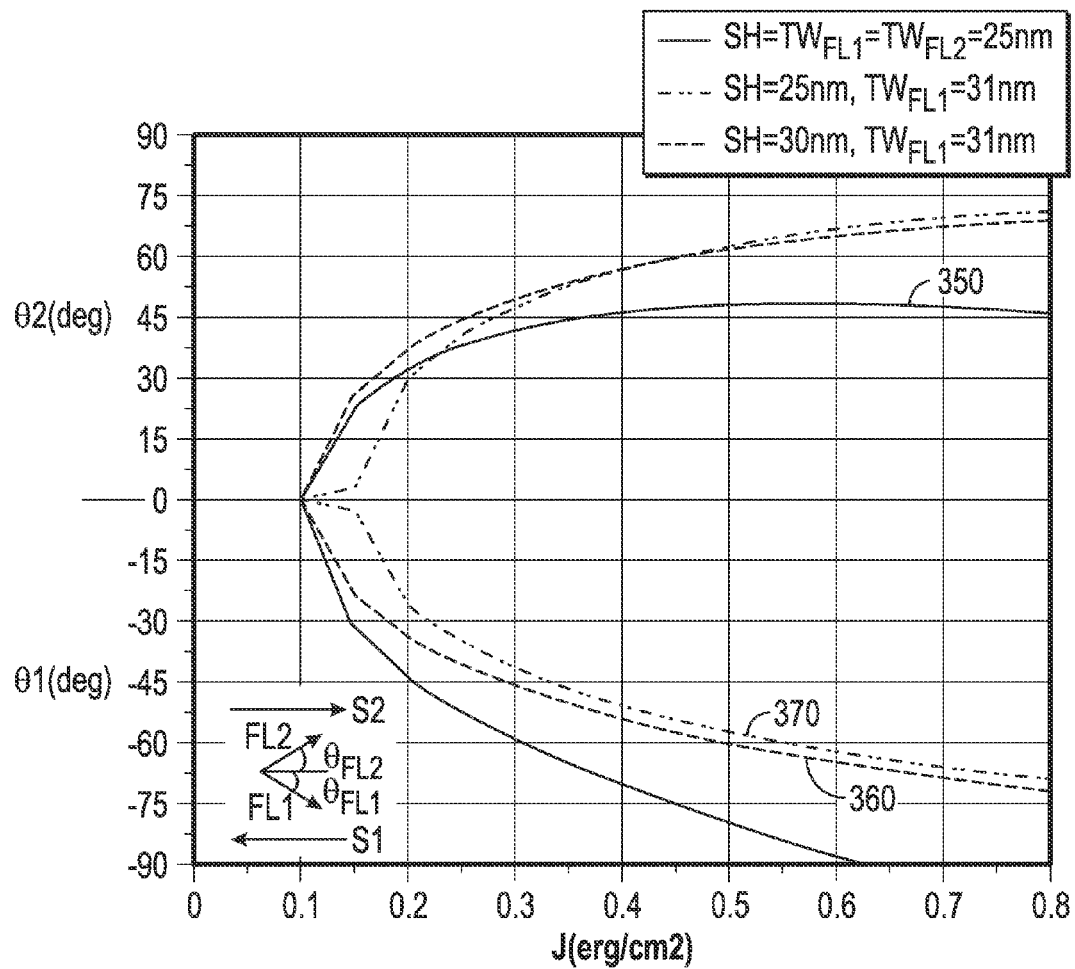
FIG. 8A is a graph of θ1 and θ2 as a function of coupling strength J across the antiparallel coupling (APC) layer of the APF structure, as modeled by simulation software, for various dimensions of the first and second free layers of the APF structure.
Figure 8B:
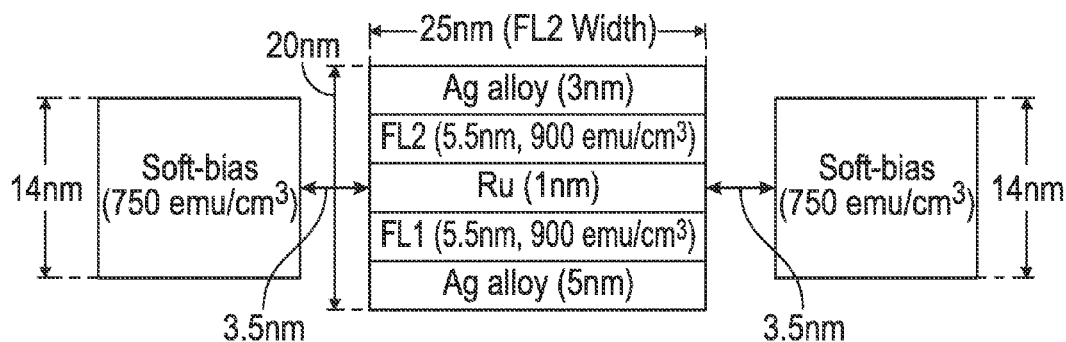
FIG. 8B is a schematic showing the parameters of the sensor modeled by the solid line in the graph of FIG. 8A.

FIG. 8A is a graph of θ1 and θ2 as a function of coupling strength J across the APC layer between FL1 and FL2, as modeled by simulation software, for various dimensions of FL1 and FL2. FIG. 8B is a schematic showing the parameters of the modeled sensor. FIG. 8A thus illustrates how the dimensions TW and SH can be varied to achieve the desired values for θ1 and θ2. For example, the curves 350, 360, 370 show that the optimal bias point (θ1=θ2=45 deg.) can be achieved by adjusting J to between about 0.2 to 0.5 erg/cm². The bias field from the soft side shields, which is 750 emu/cm³ in this model, can also be adjusted, which would provide a different set of curves and thus an additional method for achieving the optimal bias point.

In the embodiment of FIG. 6 the biasing layers 315 at the side edges of FL1 and FL2 are formed of soft magnetic material and maintain their magnetization directions via exchange coupling to S2. However, alternatively the biasing layers may be formed of a hard magnetic material like CoPt or CoPtCr.

The CPP-MR sensor 300 described above and illustrated in FIGS. 6-7 is a CPP-GMR sensor, in which the nonmagnetic spacer layers 330, 430 are formed of an electrically conducting material, typically a metal like Cu, Au or Ag or their alloys. Alternatively, the CPP-MR sensor may be a CPP tunneling MR (CPP-TMR) sensor, in which case the nonmagnetic spacer layers 330, 430 would be a tunnel barrier formed of an electrically insulating material, like $TiO_2$, MgO or $Al_2O_3$.

Figure 9:
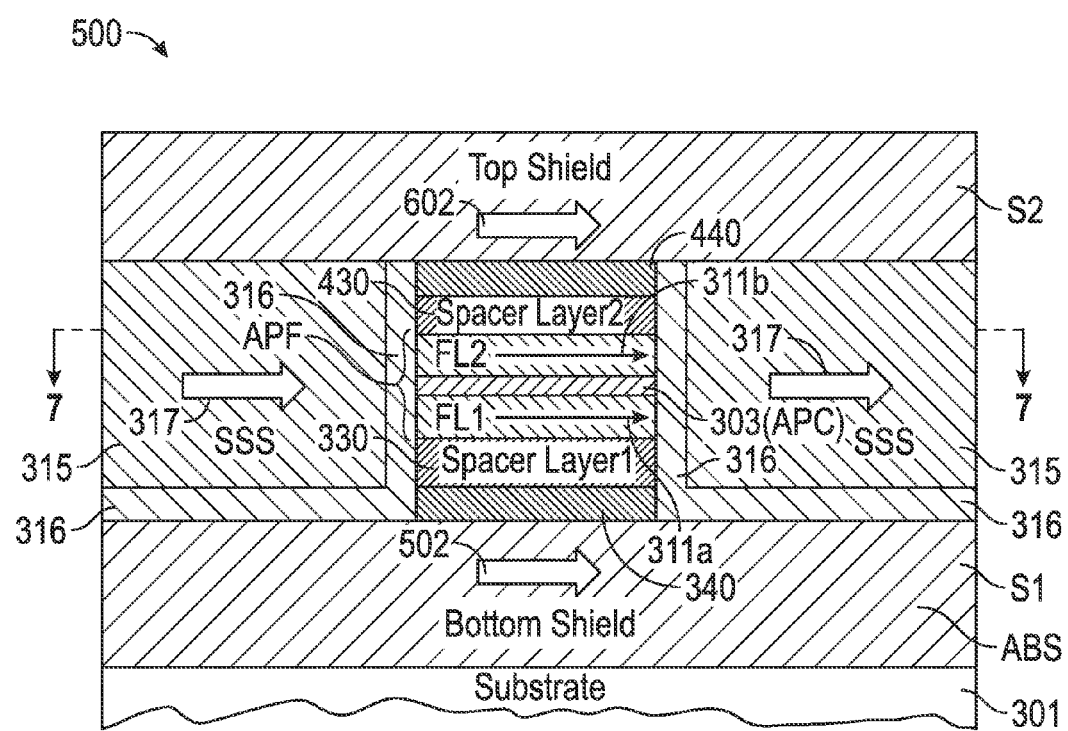
FIG. 9 is an enlarged sectional view showing the layers making up a sensor according to another embodiment of the invention as would be viewed from the disk.

FIG. 9 is an enlarged sectional view showing the layers making up a sensor 500 according to another embodiment of the invention as would be viewed from the disk. In this embodiment, S1 and S2 have parallel magnetizations 502, 602, respectively. In this case the materials chosen for S1, interface layer 340, spacer layer 330 and FL1, which form the lower magnetoresistive spin-valve, are chosen so that the sign of the magnetoresistive effect is opposite that of the magnetoresistive effect for the upper magnetoresistive spin-valve (FL2, spacer layer 430, interface layer 440 and S2). Specifically, the sign of the magnetoresistive effect is determined by the sign of the interfacial spin scattering coefficients at the spacer layer interfaces, and the signs of the bulk spin-scattering coefficients within the magnetic layers on either side of the spacer layer. By selecting the materials and compositions of the interfaces and the materials and compositions of the magnetic layers, the overall sign of the magnetoresistive effect can be tuned. If the overall sign of the spin scattering in the bulk and at the interface of one magnetic layer (for example FL2) is the same as the overall sign of the spin scattering in the bulk and at the interface of the other magnetic layer (for example interface layer 440), then the sign of the magnetoresistance effect for that spin-valve will be negative (standard). If the signs are opposite, then the sign of the magnetoresistance effect for that spin-valve will be positive (inverse). For example, magnetic materials with positive bulk scattering coefficients include NiFe and CoFe, and magnetic materials with negative bulk scattering coefficients include NiCr and FeV. Magnetic/spacer interfaces with positive interfacial scattering coefficients include Co/Cu and CoFe/Ag, and magnetic/spacer interfaces with negative interfacial scattering coefficients include Fe/Cr. By choosing the appropriate materials in the magnetic layers and in the spacers, the overall signs of the lower and upper spin-valves can be adjusted. Thus in the embodiment of FIG. 9, FL2 may be formed of CoFe, spacer layer 430 may be formed of Ag and interface layer 440 may be formed of CoFe; and FL1 may be formed of CoFe, spacer layer 330 may be formed of a Ag/Cr bilayer where Cu is in contact with FL1, and interface layer 340 may be formed of FeV, or alternatively a Fe/FeV bilayer where Fe is in contact with spacer layer 330. This would result in the sign of the magnetoresistive effect for the lower spin-valve being opposite that of the magnetoresistive effect for the upper magnetoresistive spin-valve. Thus S1 and S2 should have parallel magnetizations 502, 602, respectively.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A current-perpendicular-to-the-plane (CPP) magnetoresistive sensor comprising:
   a substrate;
   a first shield layer of magnetically permeable material on the substrate, the first shield layer having an in-plane magnetization direction fixed in the presence of the external magnetic field to be sensed;
   a first nonmagnetic spacer layer on the first shield layer;
   an antiparallel free (APF) structure on the first spacer layer comprising first and second ferromagnetic free layers and an antiparallel coupling (APC) layer between said first and second ferromagnetic free layers, the APF structure having two spaced-apart side edges;
   a second nonmagnetic spacer layer on the APF structure;
   a second shield layer of magnetically permeable material on the second nonmagnetic spacer layer, the second shield layer having an in-plane magnetization direction fixed in the presence of the external magnetic field to be sensed; and
   a ferromagnetic side biasing layer at each side edge of the APF structure and having a magnetization direction substantially parallel to the magnetization direction of at least one of the first and second shield layers; wherein in the absence of a magnetic field to be sensed the magnetization directions of the first and second free layers are oriented relative to one another at a non-zero angle less than 180 degrees and are biased toward the direction of magnetization of the side biasing layers.

2. The sensor of claim 1 wherein the second shield layer is ferromagnetically coupled to the side biasing layers, wherein the magnetization direction of the second shield layer is antiparallel to the magnetization direction of the first shield layer, and wherein the sensor is adapted for receipt of electron current in the direction from the second shield layer to the first shield layer.

3. The sensor of claim 1 wherein the first shield layer is ferromagnetically coupled to the side biasing layers, wherein the magnetization direction of the first shield layer is antiparallel to the magnetization direction of the second shield layer, and wherein the sensor is adapted for receipt of electron current in the direction from the first shield layer to the second shield layer.

4. The sensor of claim 1 further comprising a magnetic interface layer between at least one of the first shield layer and first nonmagnetic spacer layer and the second shield layer and second nonmagnetic spacer layer.

5. The sensor of claim 4 wherein the magnetic interface layer is selected from a CoFe alloy wherein Fe is present in said alloy in an amount greater than about 40 atomic percent and less than about 60 atomic percent, a Heusler alloy of the type $Co_2MnZ$ or $Co_2FeZ$ where Z is one of Ge, Si or Al, and an alloy of $(CoFe)_{1-x}Y_x$ where Y is one of Ge, Si, Al or Ga.

6. The sensor of claim 1 wherein in the absence of a magnetic field to be sensed the magnetization directions of the first and second free layers are oriented relative to one another at an angle greater than 60 degrees and less than 120 degrees.

7. The sensor of claim 1 wherein the side biasing layer is formed of an alloy comprising Ni and Fe with permeability ($\mu$) greater than 100 and a saturation magnetization $M_s$ greater than or equal to 450 emu/cm$^3$ and less than or equal to 900 emu/cm$^3$.

8. The sensor of claim 1 wherein the sensor is a giant magnetoresistance sensor and the first and second nonmagnetic spacer layers are electrically conductive.

9. The sensor of claim 1 wherein the sensor is a tunneling sensor and the first and second nonmagnetic spacer layers are electrically insulating.

10. The sensor of claim 1 wherein the magnetization directions of the first and second shield layers are substantially parallel.

11. The sensor of claim 1 wherein the magnetization directions of the first and second shield layers are substantially antiparallel.

12. A magnetic recording disk drive comprising:
a magnetic recording disk having a recoding layer with tracks containing recorded data;
the sensor of claim 1 for detecting the data in the data tracks; and
an actuator connected to said sensor for moving said sensor to the data tracks.

13. A current-perpendicular-to-the-plane (CPP) magnetoresistive (MR) read head for reading magnetically recorded data from tracks on a magnetic recording disk in a disk drive, the head comprising:
an air-bearing slider having an air-bearing surface (ABS) for facing the disk and a trailing surface generally orthogonal to the ABS;
a first shield layer (S1) of magnetically permeable material on the trailing surface, S1 having a fixed in-plane magnetization direction substantially parallel to the ABS;
a first nonmagnetic spacer layer on S1;
an antiparallel free (APF) structure on the first spacer layer and having two spaced-apart side edges, the APF structure comprising a first ferromagnetic free layer (FL1) on the first nonmagnetic spacer layer, a second ferromagnetic free layer (FL2), and an antiparallel coupling (APC) layer on FL1 between FL1 and FL2, wherein FL1 and FL2 have magnetizations in the spin-flop state;
a second nonmagnetic spacer layer on FL2;
a second shield layer (S2) of magnetically permeable material on the second nonmagnetic spacer layer, S2 having a fixed in-plane magnetization direction substantially parallel to the ABS and antiparallel to the magnetization of S1; and
a side shield of soft magnetic material at each side edge of the APF structure and having a magnetization direction substantially parallel to the magnetization direction of one of S1 and S2, the soft side shields having magnetizations sufficient to maintain the magnetizations of FL1 and FL2 in the spin-flop state.

14. The read head of claim 13 wherein S2 is ferromagnetically coupled to the side shields and wherein the read head is adapted for receipt of electron current in the direction from S2 to S1.

15. The read head of claim 13 wherein S1 is ferromagnetically coupled to the side shields and wherein the read head is adapted for receipt of electron current in the direction from S1 to S2.

16. The read head of claim 13 further comprising a first magnetic interface layer between S1 and the first nonmagnetic spacer layer, and a second magnetic interface layer between the second nonmagnetic spacer layer and S2, and wherein each magnetic interface layer is selected from a CoFe alloy wherein Fe is present in said alloy in an amount greater than about 40 atomic percent and less than about 60 atomic percent, a Heusler alloy of the type $Co_2MnZ$ or $Co_2FeZ$ where Z is one of Ge, Si or Al, and an alloy of $(CoFe)_{1-x}Y_x$ where Y is one of Ge, Si, Al or Ga.

17. The read head of claim 13 wherein in the absence of a magnetic field to be sensed the spin-flop state is the state wherein the magnetization directions of FL1 and FL2 are oriented relative to one another at an angle greater than or equal to 60 degrees and less than 120 degrees.

18. The read head of claim 13 wherein the side shields are formed of an alloy comprising Ni and Fe with permeability ($\mu$) greater than 100 and a saturation magnetization $M_s$ greater than or equal to 450 emu/cm$^3$ and less than or equal to 900 emu/cm$^3$.

19. The read head of claim 13 wherein the read head is a giant magnetoresistance read head and the first and second nonmagnetic spacer layers are electrically conductive.

20. The read head of claim 13 wherein the read head is a tunneling magnetoresistive read head and the first and second nonmagnetic spacer layers are electrically insulating.

* * * * *